US008655752B2

(12) United States Patent
Swan

(10) Patent No.: US 8,655,752 B2
(45) Date of Patent: Feb. 18, 2014

(54) APPARATUS AND METHOD FOR ANALYZING CROSS-ENTERPRISE RADIO FREQUENCY TAG INFORMATION

(75) Inventor: Richard James Swan, Portola Valley, CA (US)

(73) Assignee: Portiski Research LLC, Wilmington, DE (US)

( * ) Notice: Subject to any disclaimer, the term of this patent is extended or adjusted under 35 U.S.C. 154(b) by 37 days.

(21) Appl. No.: 11/317,988

(22) Filed: Dec. 22, 2005

(65) Prior Publication Data

US 2006/0232410 A1 Oct. 19, 2006

Related U.S. Application Data

(60) Provisional application No. 60/639,019, filed on Dec. 23, 2004.

(51) Int. Cl.
*A01K 5/02* (2006.01)
*G06F 17/50* (2006.01)
*G08B 13/14* (2006.01)
*G06Q 10/00* (2012.01)

(52) U.S. Cl.
USPC .............................. 705/29; 340/572.1; 705/28

(58) Field of Classification Search
USPC .......................................................... 705/29
See application file for complete search history.

(56) References Cited

U.S. PATENT DOCUMENTS

| | | | |
|---|---|---|---|
| 4,651,150 A | 3/1987 | Katz et al. | |
| 5,856,931 A | 1/1999 | McCasland | |
| 6,318,636 B1 | 11/2001 | Reynolds et al. | |
| 6,415,978 B1 | 7/2002 | McAllister | |
| 6,523,752 B2 | 2/2003 | Nishitani et al. | |
| 6,563,417 B1 | 5/2003 | Shaw | |
| 6,677,852 B1 | 1/2004 | Landt | |
| 6,945,458 B1 | 9/2005 | Shah et al. | |
| 7,053,777 B2 | 5/2006 | Allen | |
| 7,136,832 B2 * | 11/2006 | Li et al. | 705/34 |
| 7,199,715 B2 | 4/2007 | Fields et al. | |
| 7,292,963 B2 * | 11/2007 | Bornhoevd et al. | 702/188 |
| 7,617,133 B1 | 11/2009 | Antony et al. | |
| 2002/0005774 A1 | 1/2002 | Rudolph et al. | |
| 2002/0036232 A1 | 3/2002 | Massod | |
| 2002/0183882 A1 | 12/2002 | Dearing et al. | |
| 2003/0034390 A1 | 2/2003 | Linton et al. | |
| 2003/0227392 A1 * | 12/2003 | Ebert et al. | 340/825.49 |
| 2004/0178264 A1 | 9/2004 | Linton et al. | |
| 2005/0060171 A1 | 3/2005 | Molnar | |
| 2005/0197844 A1 * | 9/2005 | Ng et al. | 705/1 |
| 2005/0216767 A1 | 9/2005 | Mitsuoka et al. | |

OTHER PUBLICATIONS

OA dated Aug. 31, 2012 for U.S. Appl. No. 12/941,852, 22 pages.

* cited by examiner

*Primary Examiner* — Paul Danneman
(74) *Attorney, Agent, or Firm* — Turocy & Watson, LLP

(57) ABSTRACT

The invention includes a computer readable medium with executable instructions to analyze radio frequency (RF) tag information. The executable instructions access cross-enterprise RF tag information, identify a product transition based upon the cross-enterprise RF tag information, define a new product path based upon the product transition, and apply logic to the new product path to facilitate cross-enterprise product flow analysis.

31 Claims, 6 Drawing Sheets

| Row | Src | Loc | BP | BizFunction | SupplyFunction | Transit | Site |
|---|---|---|---|---|---|---|---|
| 1 | src:217.100 | loc:217.1 | bp:217 | Retail | BackRoom | Retail_In | WM:217 |
| 2 | src:217.104 | loc:217.2 | bp:217 | Retail | FrontRoom | Retail_Other | WM:217 |
| 3 | src:217.105 | loc:217.3 | bp:217 | Retail | Crusher | Retail_Other | WM:217 |
| 4 | src:217.112 | loc:217.2 | bp:217 | Retail | FrontRoom | Retail_Other | WM:217 |
| 5 | src:217.113 | loc:217.2 | bp:217 | Retail | FrontRoom | Retail_Other | WM:217 |
| 6 | src:421.100 | loc:421.1 | bp:421 | Retail | BackRoom | Retail_In | WM:421 |
| 7 | src:421.104 | loc:421.2 | bp:421 | Retail | FrontRoom | Retail_Other | WM:421 |
| 8 | src:6068.100 | loc:6068.1 | bp:6068 | Distribution | Distribution_In | Distribution_In | WMDC:6068 |
| 9 | src:6068.101 | loc:6068.1 | bp:6068 | Distribution | Distribution_Out | Distribution_other | WMDC:6068 |
| 10 | src:6068.102 | loc:6068.2 | bp:6068 | Distribution | Depal | Distribution_other | WMDC:6068 |
| 11 | src:6068.103 | loc:6068.2 | bp:6068 | Distribution | Low_Speed | Distribution_other | WMDC:6068 |
| 12 | src:222222222.1 | loc:222222222.1 | bp:222222222 | Manufacturing | Manuf_Out | Manufacturing | HP:D714 |
| 13 | src:222222222.2 | loc:222222222.2 | bp:222222222 | Manufacturing | Manuf_Out | Manufacturing | HP:D714 |

*FIG. 5*

| Current Event | PriorDesignation | CurrentDesignation | Path |
|---|---|---|---|
| At start | " " | " " | " " |
| E1 | Manufacturing | Manufacturing | Manufacturing |
| E2 | Manufacturing | Distribution | Manufacturing → Distribution |
| E3 | Distribution | Distribution | Manufacturing → Distribution |
| E4 | Distribution | Distribution | Manufacturing → Distribution |
| E5 | Distribution | Distribution | Manufacturing → Distribution |
| E6 | Distribution | Retail | Manufacturing → Distribution → Retail |
| E7 | Retail | Retail | Manufacturing → Distribution → Retail |
| E8 | Retail | Retail | Manufacturing → Distribution → Retail |

*FIG. 6*

APPARATUS AND METHOD FOR ANALYZING CROSS-ENTERPRISE RADIO FREQUENCY TAG INFORMATION

CROSS REFERENCE TO RELATED APPLICATIONS

This application claims the benefit of U.S. Provisional Patent Application No. 60/639,019, entitled, "Apparatus and Method for Analyzing Cross-Enterprise Radio Frequency Tag Information," filed Dec. 23, 2004, the contents of which are hereby incorporated by reference in their entirety.

BRIEF DESCRIPTION OF THE INVENTION

This invention relates generally to radio frequency tags that are used to uniquely identify products. More particularly, this invention relates to analyzing radio frequency tag information associated with the movement of products across different enterprises.

BACKGROUND OF THE INVENTION

FIG. 1 illustrates a supply chain 100. A set of manufacturers, 102_1 and 102_2, distribute products to a set of warehouses 104_1 and 104_2, respectively. Warehouse 104_1 then distributes products to first and second distributors 106_1 and 106_2, while warehouse 104_2 distributes products to third and fourth distributors 106_3 and 106_4. The first distributor 106_1 then distributes products to one or more retail outlets, such as a first retailer 108_1. The remaining distributors distribute products to retails 108_2, 108_3, and 108_4.

Arrows 110 illustrate the insertion of counterfeit goods into the supply chain 100. In one case, counterfeit goods are introduced at a warehouse 104_2 and in another case counterfeit goods are introduced at a distributor 106_4. In either case, enterprises downstream from the counterfeit insertion event have a difficult time identifying the counterfeit goods.

Arrow 112 illustrates a possible path for an improper resale or return of an item. In this case, the distributor 106_2 is bypassed and therefore the resale and return rules potentially enforced by the distributor 106_2 are bypassed.

Arrows 114 illustrate potential improper import paths into the supply chain 100. In this case, distributor 106_1 and retailer 108_1 directly receive improperly imported goods. Thus, import restrictions to be enforced by warehouses 104 are bypassed.

The foregoing supply chain abuses and many other supply chain abuses are coming under increasing scrutiny. In addition, there is growing interest in tracking product movement to optimize legitimate supply chain operations. For example, improved information on the movement of a product through a supply chain allows enterprises to more closely analyze trends in product consumption. This allows enterprises to implement the supply chain more efficiently. In addition, more comprehensive supply chain information allows more accurate predictions of future consumption patterns.

The potential to thwart supply chain abuses and to improve supply chain efficiency has led various government agencies and large commercial enterprises to require the use of radio frequency (RG) tags. A radio frequency tag is analogous to a bar code in the sense that it is used to uniquely identify a product. However, where a bar code relies upon a visual pattern to uniquely identify a product, an RF tag uses an RF signal signature to uniquely identify a product. An RF tag reader or scanner adjacent to an RF tag records the presence of the RF tag. The reader or scanner can then deliver RF tag information to a database, allowing the RF tag information to be processed.

While the use of RF tags within a single enterprise (e.g., a manufacturer, a warehouse, a distributor, or a retailer) is known, there are many challenges associated with the use of RF tags across enterprises (e.g., tracking RF tag information from a manufacturer through a retailer). One problem with cross-enterprise analysis is efficient processing of the vast amount of information associated with the movement of multiple products through multiple tiers of multiple supply chains.

In view of the foregoing, it would be highly desirable to provide a technique for the efficient processing of cross-enterprise RF tag information. Ideally, the processing of this information is used to improve the function of the supply chain and to identify abuses within the supply chain.

SUMMARY OF THE INVENTION

The invention includes a computer readable medium with executable instructions to analyze radio frequency (RF) tag information. The executable instructions access cross-enterprise RF tag information, identify a product transition based upon the cross-enterprise RF tag information, define a new product path based upon the product transition, and apply logic to the new product path to facilitate cross-enterprise product flow analysis.

BRIEF DESCRIPTION OF THE FIGURES

The invention is more fully appreciated in connection with the following detailed description taken in conjunction with the accompanying drawings, in which:

FIG. 5 illustrates exemplary RF tag information that may be processed in accordance with an embodiment of the invention.

FIG. 6 illustrates product paths corresponding to the data of FIG. 5.

Like reference numerals refer to corresponding parts throughout the several views of the drawings.

DETAILED DESCRIPTION OF THE INVENTION

Figure 1:
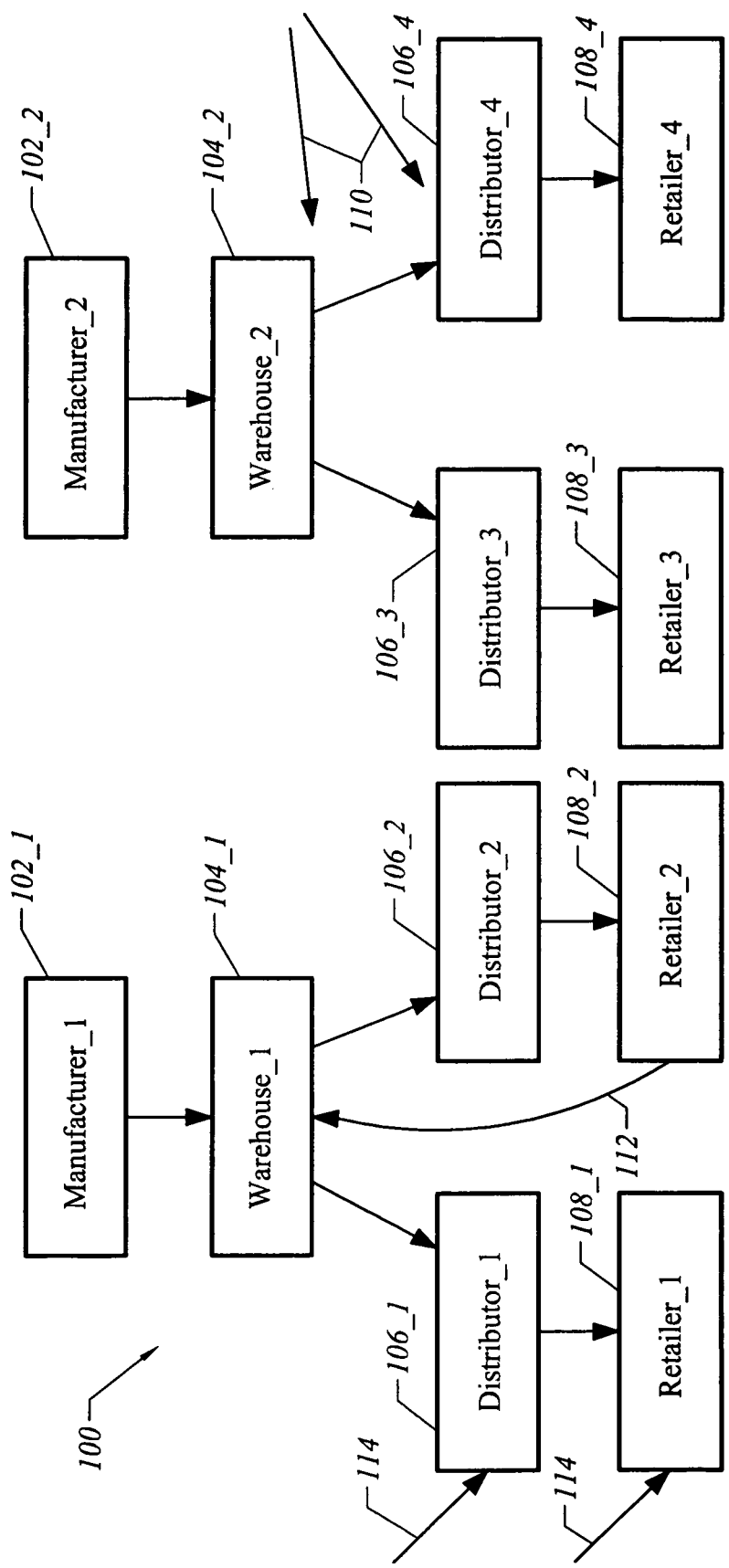
FIG. 1 illustrates a prior art supply chain.
Figure 2:
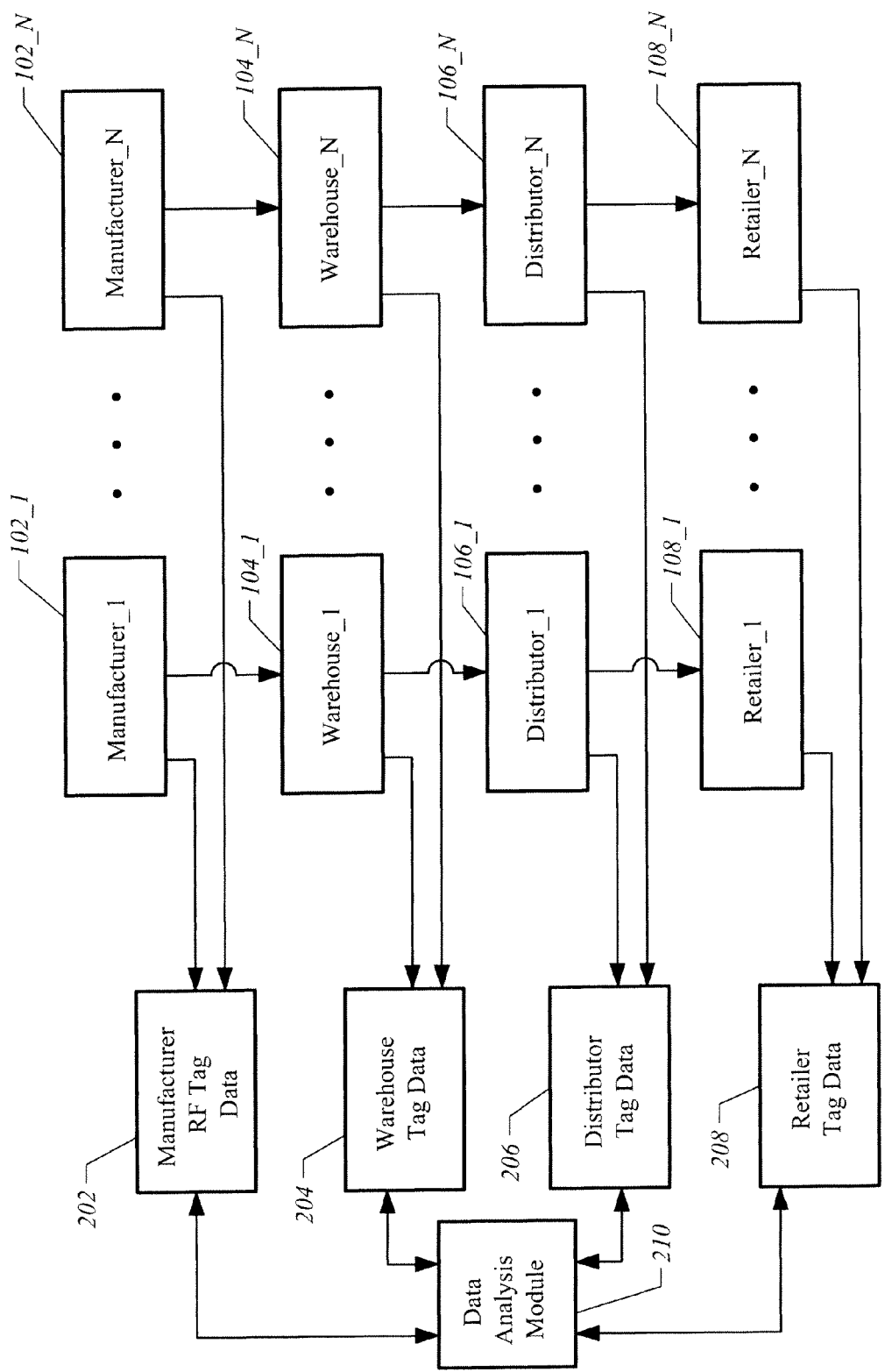
FIG. 2 illustrates the routing of RF tag information from a supply chain for processing in accordance with an embodiment of the invention.

FIG. 2 illustrates a supply chain 200 utilizing RF tag information. Manufacturers 102_1 through 102_N produce RF tag information upon manufacturing products. For example, a manufacturer produces a product, places a tag on the product, and then uses an RF scanner to record a product number and attributes associated with the product (e.g., date manufactured, location manufactured, type of product, and the like). This RF tag information is routed to a repository to form manufacturer RF tag data 202.

When the manufactured products are moved to warehouses, RF tag data are accumulated. In particular, warehouses 104_1 through 104_N generate warehouse tag data 204. In a similar manner, when the same products are moved to distributors, more RF tag data are accumulated for the products. In particular, distributors 106_1 through 106_N generate distributor tag data 206. Finally, when the products are moved to the retail level, more RF tag data are accumulated. FIG. 2 illustrates that retailers 108_1 through 108_N produce retailer tag data 208.

A data analysis module 210, configured in accordance with an embodiment of the invention, processes the cross-enterprise RF tag data. The data analysis module 210 facilitates "horizontal" (i.e., across a row of the supply chain, such as all manufacturers) data analyses as well as "vertical" (e.g., down a column of the supply chain, such as from a manufacturer to a retailer) data analyses.

Figure 3:
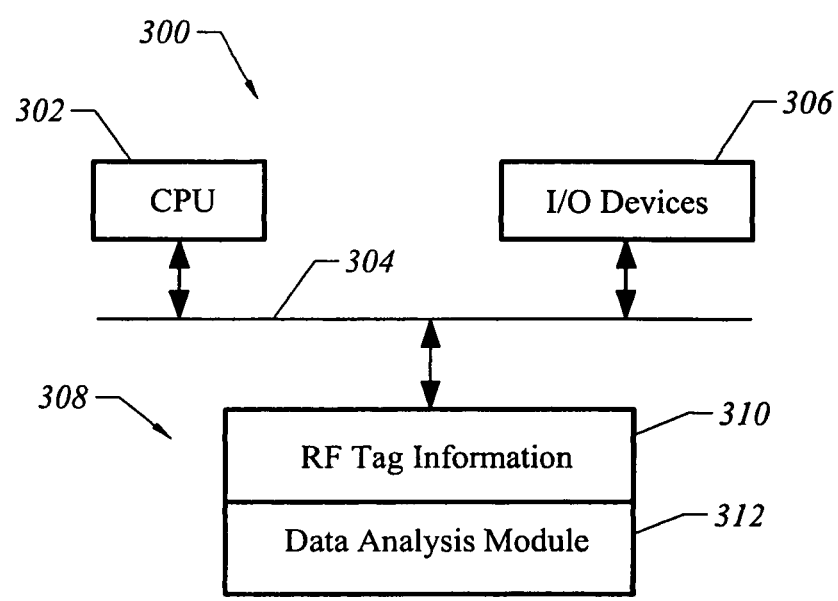
FIG. 3 illustrates a computer configured in accordance with an embodiment of the invention.

FIG. 3 illustrates a computer 300 configured in accordance with an embodiment of the invention. The computer 300 includes standard components including a central processing unit 302, which is connected to a bus 304. Also connected to the bus 304 are input/output devices 306. The input/output devices 306 may include a keyboard, mouse, monitor, printer, and the like. In addition, the input/output devices 306 include network interfaces to communicate with a network of computers generating RF tag data. So, for example, the input/output devices 306 are connected to one more data repositories storing manufacturer tag data 202, warehouse tag data 204, distributor tag data 206, and retailer tag data 208.

A memory 308 is also connected to the bus 304. The memory 308 stores RF tag information 310, such as RF tag information that is accessed through the input/output devices 306. A data analysis module 312 processes the RF tag information. The data analysis module includes executable instructions to implement the RF tag processing functions described herein.

Figure 4:
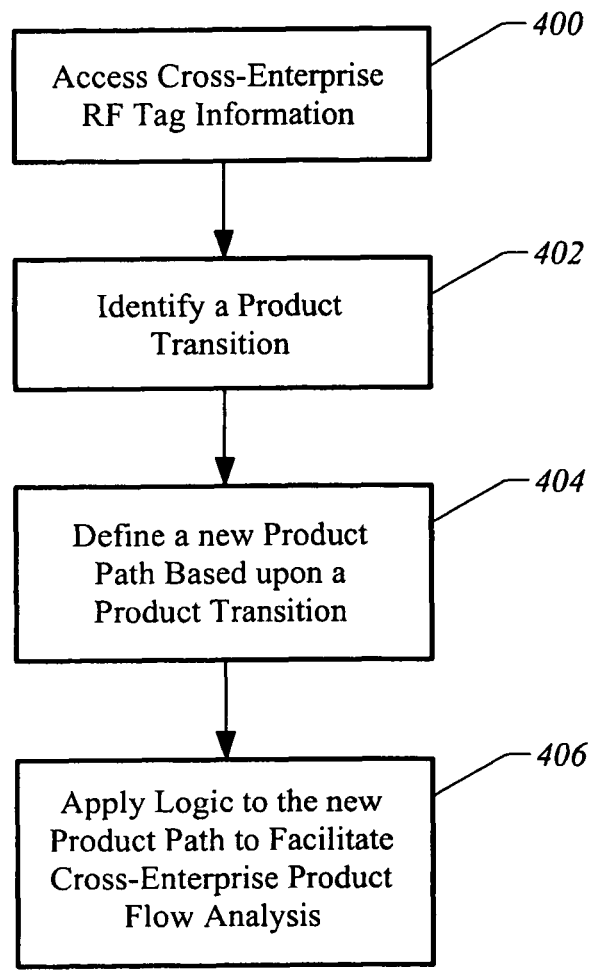
FIG. 4 illustrates processing operations associated with an embodiment of the invention.

FIG. 4 illustrates processing operations associated with one embodiment of a data analysis module of the invention. The first processing operation of FIG. 4 is to access cross-enterprise RF tag information 400. As used herein, the term cross-enterprise RF tag information includes "horizontal" cross-enterprise RF tag information (e.g., from one warehouse to another) and "vertical" cross-enterprise RF tag information (e.g., from a warehouse to a distributor to a retailer).

The cross-enterprise RF tag information is processed to identify a product transition 402. A product transition represents the movement of a product across enterprises, either horizontally or vertically.

A new product path is then defined based upon a product transition 404. Logic is then applied to the new product path to facilitate cross-enterprise product flow analysis 406. The foregoing operations are more fully appreciated in connection with some specific examples.

The invention can be used in connection with a variety of RF tag information. For example, the RF tag information may relate to events, such as:
  Commission tag
  Sight tag
  Pack tag into higher level assembly
  Unpack
  Ship
  Receive
  Product Return
  Product Recall
  Warrantee Claim
  Medical Reimbursement Claim
  The RF tag information may relate to sources, such as:
  Map to location
  Default Action
  Authorized Operations
  The RF tag information may also relate to locations, such as:

Company/Division/Region/Site/Area/SubArea
Transit bins
Business Function Performed
  Manufacture
  Distribution Level
  Retail
The RF tag information can have historical components, such as:
  Sequence of sightings
  Sequence of Hierarchical Locations
  Time periods spent at each location In accordance with the invention, the movement of a tagged object can be viewed at many levels or within many dimensions. For example, the following basic information may be available:

| Jan. 1, 2004 10:00 | Commission | Big.Cinncinatti.plant3.room2→ |
| Jan. 1, 2004 11:20 | Pack | Big.Cincinnatti.plant3.room4→ |
| Jan. 3, 2004 07:30 | Sight | NationWide.Colorado>Denver#2.receiving→ |
| Jan. 4, 2004 14:03 | Ship | NationWide.Colorado>Denver#2.shipping→ |
| Jan. 7, 2004 15:27 | Receive | GroceryExpress.Atlanta.dock3→ |
| Jan. 8, 2004 08:53 | Sight | GroceryExpress.Atlanta.storage.room27→ |
| Jan. 8, 2004 13:11 | Ship | GroceryExpress. Atlanta.Shipping4→ |
| Jan. 12, 2004 16:44 | Receive | EasyStop.Canada.Toronto.BackRoom→ |
| Jan. 15, 2004 15:48 | Sight | EasyStop. Canada.Toronto.FrontRoom |

This example can be used to illustrate various path dimensions that may be exploited in accordance with the invention. The use of paths facilitates different analyses in accordance with the invention. The use of paths allows various amounts of data to be processed, either with fine resolution for detailed paths or course resolution for more general paths. Consider the following detailed paths defining the location of the tagged object in this example.

Big.Cinncinatti.plant3.room2 ➔
Big.Cincinnatti.plant3.room4 ➔
NationWide.Colarado.Denver#2.receiving ➔
NationWide.Colarado.Denver#2.shipping ➔
GroceryExpress.Atlanta.dock3 ➔
GroceryExpress.Atlanta.storage.room27 ➔
GroceryExpress.Atlanta.Shipping4 ➔
EasyStop.Canada.Toronto.BackRoom ➔
EasyStop.Canada.Toronto.FrontRoom Now consider a more generalized path that effectively filters or reduces the amount of data. Instead of all locations, as in the previous example, this example tracks corporate level locations.

Big ➔ NationWide ➔ GroceryExpress ➔ EasyStop

For the same example, paths can be considered at a functional level: Manufacturer ➔ Manufacturer ➔ DistributorLevel ➔ DistributorLevel1 ➔ DistributorLevel2 ➔ DistributorLevel2 ➔ Retail ➔ Retail The same example can be used to define paths at a national boundary level: USA ➔ USA ➔ USA ➔ USA ➔ USA ➔ USA ➔ USA ➔ Canada ➔ Canada The same example can be used to define paths at an individual operation level: Commission ➔ Pack ➔ Sight ➔ Sight ➔ Receive ➔ Sight ➔ Ship ➔ Receive ➔ Sight The same example can be used to define paths by absolute time:
Jan 1 2004 10:00 ➔
Jan 1 2004 11:20 ➔

Jan 3 2004 07:30→
Jan 4 2004 14:03→
Jan 7 2004 15:27→
Jan 8 2004 08:53→
Jan 8 2004 13:11→
Jan 12 2004 16:44→
Jan 15 2004 15:48

Paths can also be defined by the amount of time between transitions. Thus, in the foregoing example, the following path results: 0:0:00→0:1:20→1:06:27→3:01:25→0:17:26→0:04:42→4:03:33→3:23:04

The foregoing example can also be used to create a path for tag locations as categorized as transit times (time between sites): 1:06:27→3:01:25→4:03:33

As will be described in detail below, these various paths may be characterized through regular expressions and/or other techniques. Path expression is used in accordance with the invention to limit the amount of data that needs to be processed, thereby facilitating cross-enterprise analyses.

Various techniques may be used to form any given path. Consider the raw RF tag data of FIG. 5. Each row characterizes an RF tag event, specifying a tag reading source, the location for the tag reading source, a business process (BP) code, a business function (BizFunction) associated with this level of the supply chain, a supply function associated with this level of the supply chain, transit characterization for the product at this point in the supply chain, and site specification. Observe that the business function, supply function, and transit fields have different descriptive characterizations.

The following pseudo code may be used to create a path characterizing changes in RF tag information.

```
PriorDesignation := null
Path:= " " //initially an empty path
While (remaining raw events) {
        CurrentEvent := nextRawEvent
        CurrentDesignation = Lookup Designation based on
                        CurrentEvent, Level, and
                        Table of Levels
        If (CurrentDesignation different from Prior Designation) {
                Path = Path & '→' & CurrentDesignation
                }
        PriorDesignation := Current Designation
        }
```

The application of this pseudo code to the data of FIG. 5 results in the path data of FIG. 6. Observe that the logic is initially applied to the bottom (row 13) of the raw data. Each row represents an event. The path at each stage of processing is shown. Additions to the path occur at event E1, E2, and E6.

In FIG. 6 there are 4 instances of a manufacturing→distribution path. These four instances have common product transition characteristics. There are 3 instances of a manufacturing→distribution→retail path. These three instances have common product transition characteristics. In a more complex example, individual retailers, distributors, and manufacturers can be specified. In such a case, common product transition characteristics would be those that have common specific retailers, distributors, and manufacturers. Alternately, one could define common product transition characteristics as having specific retailers and distributors, but any manufacturer. Any variation of such path definitions may be defined in accordance with the invention.

Various forms of logic may be applied to paths created in accordance with the invention. For example, path analysis can be used to determine many important aspects of the state of a supply chain. A basic objective in supply chain analysis is to gain visibility of all the goods of interest. When optimizing the quantity to manufacture, order, or ship it is desirable to know both the quantities at each location within the supply chain and also their disposition. Are the products available for sale or are they being returned? Have the tagged cases shipped to a particular retail store, been unpacked, stocked on the shelves, and passed to the trash compactor (signifying the end-of-life for the case)?

In the simple example below, for a given time period and selection of products, a total of 900 products have been issued into the distribution chain. Path analysis shows that 237 products have reached the distributor and therefore should be available to be shipped to a retail establishment. A total of 593 products have passed through a distributor to reach retail. A further 70 products have been reported as sold to a consumer (through a point-of-sale tag reader, for example).

| Path | Quantity |
| --- | --- |
| Manufacturer→Distributor | 237 |
| Manufacturer→Distributor→Retailer | 593 |
| Manufacturer→Distributor→Retailer→Consumer | 70 |
| | 900 |

By considering the rate of change of these categories over time, the velocity (products per unit of time) is computed. This is a direct measure of product flow. Flow at the consumer level is a direct measure of consumer demand. If the flow in the supply chain is unbalanced in the direction of incoming supply exceeding demand, then inventory will accumulate and eventually orders must stop. If demand exceeds supply, then eventually the supply chain is drained and the product will be out-of-stock.

In accordance with the invention, supply chain logic is used to characterize supply chain phenomenon, such as product velocity. This supply chain logic is in the form of executable instructions used to analyze supply path transitions to facilitate the computation of supply chain metrics, such as product velocity.

Replenishment logic may also be applied to supply paths processed in accordance with the invention. For many products, being out-of-stock at the retail shelf level leads to loss of sales for that manufacturer as well as for the specific product. In addition to the immediate problem of losing sales, consumers may find a substitute within the store—this can lead to a long-term loss of a customer for the out-of-stock brand. If the consumer does not find a satisfactory substitute the consumer may leave without a purchase and possibly be a long-term lost customer for the store. Hence, avoiding stock absence at the shelf level is a primary objective of both manufacturers and retailers. Consider the following paths identified in accordance with the invention.

Mfg→DistributionCenter
Mfg→DistributionCenter→Backroom
Mfg→DistributionCenter→Backroom→FrontRoom This example illustrates possible paths for retail products to reach the shelf. Replenishment of the shelf may be triggered by executable instructions that make calculations based on point-of-sale consumption information and an estimated current inventory. Alternately, replenishment decisions may be made using executable instructions that track physical shelf inventory.

Using executable instructions to analyze the timing of the foregoing paths, a manufacturer can detect that a product has not been replenished for over a preset period of time. The preset time may be based on past history at a level that will avoid most false alarms, but provides a prompt indication of trouble. The preset time being exceeded can indicate that for some reason no shelf replenishment is taking place. Further analysis may determine that there is no backroom stock or that there is a procedural failure within the store. Thus, various tests may be executed to avoid replenishment failure.

The invention is also successfully exploited in connection with trade promotion. Trade promotion payments are a common method used by manufacturers to pass incentives to retailers to promote and discount products to improve sales. Promotional agreements may be in the form that the retailer agrees to sell an extra N units of the product if the manufacturer provides a promotional payment of $X per unit. In some cases, a retailer may accept the agreement, take delivery of the N additional units, and then sell all or part of the additional units to another retailer at just below the normal wholesale price. This violates the trade promotion agreement and renders the retailer ineligible to receive the payments. Consider the following example.

| | |
|---|---|
| Mfg→DistributionCenter→StoreA | Expected Flow |
| Mfg→DistributionCenter→StoreB | Possible violation of promotional agreement |
| Mfg→DistributionCenter→StoreA→StoreB | Violation of promotional agreement |

Path analysis can be used to determine if the retailer is in compliance with trade promotion rules. The table above shows both the expected, normal flow for orders to this retailer, and several variants that indicate a possible attempt to violate the agreement and fraudulently claim trade promotion payments. Thus, in accordance with an embodiment of the invention, executable code is used to identify product flow paths that violate trade promotion criteria. For example, the trade promotion criteria may be in the form of permissible trade path templates. Existing flow paths may then be compared to the permissible trade path templates. In the event of a mismatch, a product flow exception is fired.

The invention is also successfully used in connection with taxation issues. Where taxation levels vary widely between regions, there is a strong incentive to pay taxes in low taxation states and then sell the after tax products in high taxation states. This is particularly prevalent with cigarettes in the US and many other parts of the world. In accordance with an embodiment of the invention, path analysis is used to detect non-compliant movement of taxed goods. A simple example is shown below, where products intended for Nevada, and have tax paid in Nevada, are diverted to California.

| | |
|---|---|
| Mfg→NevadaDistribution→NevadaTaxPayments→NevadaRetail | Compliant |
| Mfg→NevadaDistribution→NevadaTaxPayments→CaliforniaRetail | Non-Compliant |

Thus, in accordance with an embodiment of the invention, a compliant taxation path template is created and is tested against various existing product paths to identify potentially non-compliant situations.

In addition to taxation compliance, the invention is successfully used in connection with regulatory compliance. There are numerous regulations on the movement of certain kinds of products. For example, it is currently illegal to re-import pharmaceuticals from other countries. Below is an example of a compliant trade and a non-compliant trade.

| | |
|---|---|
| USA→Canada→Retail Sale | Compliant |
| USA→Canada→USA→Retail Sale | Non-Compliant |

Thus, in accordance with the invention, once paths are defined, they may be tested for boundary transitions (e.g., Canada to USA) that do not comply with regulatory requirements. In particular, executable instructions associated with the data analysis module 312 may be used to identify non-compliant activity of this type.

It is also against FDA regulations for pharmaceuticals to be sold to a "closed-door pharmacy" and then be redistributed. Below is an example of compliant and non-compliant activity of this type.

| | |
|---|---|
| Mfg→Distributor→Closed-Door Pharmacy | Compliant |
| Mfg→Distributor→Closed-Door Pharmacy→Distributor | Non-Compliant |

Executable instructions may be used to identify redistribution from a closed-door pharmacy, in accordance with an embodiment of the invention.

The invention is also successfully used in accordance with recall initiatives. Products in the market place may be recalled for many reasons. Shipments of meat may be contaminated, pharmaceuticals may have a bad batch, cigarettes may be contaminated by poor production control during manufacture or even have there taste altered by proximity to other products, like detergent.

The path analysis techniques of the invention can aid recall initiatives in a number of ways. In one embodiment of the invention, basic steps in the recall process include:
 1. Identify that a certain set of goods must be recalled and note the serialized identification of these products.
 2. Issue a "Recall" operation on all of the affected products.
 3. Analyze the paths of the affected products to identify their current locations
 4. Notify representatives at the current locations
 5. Where recalled products are found, the operation "Return to Manufacturer" should be performed.

Once the above operations are taken, the continued operation of the recall may be monitored via path analysis. The primary objective is to ensure that the products are removed from the supply chain. An additional objective is to ensure that the products are physically returned to the manufacturer (or otherwise disposed of). It is also important to correctly credit those who return recalled products. Below are various examples of how path analysis associated with the invention can be used in connection with recall initiatives.

| | |
|---|---|
| Commission→Ship→Receive→Recall→Return→Receive at Mfg | Credit |
| Commission→Ship→Receive→Recall→RetailSale | Alert - No Credit |
| Commission→Ship→Receive→Recall→Return→RetailSale | Alert - No Credit |

The invention is also successfully used in connection with solving problems associated with cross-contamination. Cross-contamination occurs when one batch of products adversely impacts an adjacently positioned batch of products.

Cross-contamination also occurs as a result of a specific event, such as spilling of a cleanser, which impacts all susceptible products within the region of the spill. The contamination may not be discovered until later, for example, when a smoker complains that the cigarette smells "funny".

In one embodiment of the invention, the basic steps to resolve a cross-contamination problem include:

1. Exemplar product is reported and confirmed.
2. Use path analysis on this exemplar product to find its complete history.
3. Track back through that history to find where the contamination occurred.
4. Identify the approximate time period of the contamination.
5. Use path analysis both at the location level and intersect this with time information to identify all other products which were in the same place at the same time as the contamination.
6. Issue a recall on all the potentially contaminated products.

These operations maybe implemented as a set of executable instructions associated with the data analysis module 312.

The invention is also successfully used to solve product obsolescence problems. Product obsolescence can be a health regulation compliance issue to avoid selling products that have exceeded their shelf life. Product obsolescence is also a commercial issue because most retailers will not accept, or pay for, products that do not have a sufficient remaining shelf life when received. A retailer may return some products for credit if the optimal sales date is passed, for example old magazines and food products that have aged on the shelf. Product obsolescence also applies to seasonal products, like gift-wrapping and for electronic products that are superseded by a newer model.

Path analysis may be extended to allocate "pseudo" steps or events in a product path by flagging events based on the approach to the expiration of a predetermined shelf life.

| | |
|---|---|
| Fresh→ | OK to ship |
| Fresh→20 Days | Ship these first to avoid loss |
| Fresh→10 Days | Will not be accepted by retailer |
| Fresh→5 Days | Mark down in store |
| Fresh→0 Days | Recall |

For example, at the time of manufacturing or packaging a good, a "lifetime" value is associated with the good. Executable instructions are used to compare the lifetime value against a current date to compute the number of days remaining in the life of the product. The number of days is compared to a set of rules, for example of the type shown above, to identify actions that may or may not be taken in connection with the product.

The invention may also be used in connection with identifying unusual or problematic flow in the supply chain. That is, path analysis can be used both to look for product movement behavior that is expected and also to detect unusual behavior. Consider the following example:

| | |
|---|---|
| Mfg_Out→LowSpeed→HighSpeed→BackRoom→FrontRoom | Normal |
| Mfg_Out→LowSpeed→HighSpeed→LowSpeed→HighSpeed→BackRoom→FrontRoom | Recirculation on conveyor |

This real world example shows two different paths through the same retail distribution center using an automated conveyor system. The first entry is a normal path showing the products taking one trip on the low speed and high speed conveyors. The second path shows that the products took additional trips on the conveyors. Investigation showed that this was because the conveyor system would recirculate products if it did not successfully read the bar codes on the cases. A similar analysis may show recirculation in the supply chain where products go through the same distribution center multiple times. This may indicate an attempt to defraud on trade promotion payments. Thus, a flow pattern that is inconsistent with expected flow patterns, may trigger an exception, even if it is unknown what the problem is or the nature of the exception.

The invention is also successfully used in connection with the identification of counterfeit goods. Counterfeit detection is an important problem for pharmaceuticals in the USA and worldwide. Other products, such as cigarettes and fashion items, are also susceptible to counterfeiting.

Various path analyses in accordance with the invention may be used to detect counterfeit goods. For example, consider a situation in which a manufacturer of a legitimate product uses a commission tag. In this case, all products without a tag are suspect.

| | |
|---|---|
| Commission→Ship→Receive→RetailSale | Compliant product |
| Receive→RetailSale | Not Compliant - Counterfeit |

In this example, executable instructions are used to identify the absence of a commission event in a path.

The techniques of the invention may also be used to identify unauthorized product importation. All instrumented product movements establish a path for a product. These paths can be analyzed to detect unauthorized movements. For example:

| | |
|---|---|
| USA→Canada→Retail | Authorized |
| USA→Canada→USA→Retail | Not Authorized |

Again, executable instructions are used to identify impermissible boarder transitions.

Those skilled in the art will appreciate that various techniques may be used to implement the path analyses of the invention. Regular expressions are one exemplary way to match specific path expressions to discover targeted behavior. Other approaches include using graphical manipulation to build descriptions of paths that can be matched by a simple equality.

Regular expressions are a well-established mathematical way of expressing a grammar that may be used to recognize a sequence of tokens. It has been demonstrated that a finite state machine, for example any real world computer, can recognize anything expressible as a regular expression. This means that in a rather fundamental sense, regular expressions are the most powerful practical way to express patterns of states. Regular expressions are mathematically equivalent to state sequence diagrams of arbitrary finite complexity.

Regular expressions are very powerful but also may be complex to evaluate. There are variations in regular expression syntax. By way of example, the Java regular expression package may be used. An exemplary subset of the syntax is shown below.

X? X, once or not at all
X* X, zero or more times
X+ X, one or more times
X{n} X, exactly n times
X{n,} X, at least n times
X{n, m} X, at least n but not more than m times
   Logical operators
XY X followed by Y
X|Y Either X or Y
(X) X, as a capturing group
Predefined Character Classes
   Any character
   Character classes
[abc] a, b, or c (simple class)
[^abc] Any character except a, b, or c (negation)

Relying upon this syntax, various rules can be concisely expressed. For example, suppose that it is desirable to express that distribution within the USA, and also from the USA to Canada, is acceptable. In this case, the following regular expression may be used.

USA+ → (USA|Canada+)

This pattern would accept distribution within the US
USA → USA → USA → USA →
And also from the US into Canada
USA → USA → USA → USA → USA → USA → USA →
Canada → Canada
But, it would reject re-importation into the US USA →
USA → USA → USA → USA → USA → USA → Canada →
Canada → USA This example demonstrates how a simple single expression or rule can be used to test a variety of product paths, in accordance with the invention.

A regular expression can also be formed to define non-compliant distribution. The following expression precludes re-importation into the US.

USA+ → [→ USA]+ → USA+

This expression will match any product path that starts in the US, leaves the US (^USA) and then returns to the US.

A regular expression may also be used to characterize the normal life cycle of a product. Consider the following exemplary life cycle:
Commission → Sight* → Pack{1} → Sight* → Unpack{1} →
Sight*

Similarly, non-compliant life cycle events may also be defined, such as:
.* → Commission → .* → Commission → .*

The above expression will match any sequence that includes two or more commission operations on a tag. Similarly, it would be non-compliant for a tagged object to be packed twice, without an intervening unpack.
.* → pack{1} → → [unpack]* → pack → .*

Consider the diversion or re-circulation of a product that is not in compliance with marketing agreements. The following regular expression may be used in this situation.
Manufacturer+ → DistributorLevel1+ → DistributorLevel2+
→ Retail+

The regular expression above may be a compliant path for a specific industry. The regular expression below will match any re-circulation from level 2 back to level 1.
.* → DistributorLevel2+ → .* → +DistributorLevel1+

The following regular expression will match any re-circulation from the retail level backwards through the supply chain.
.* → Retail+ → .* → DistributorLevel1|DistributerLevel2|
Manufacturer → .*

A variety of regular expressions may be used to identify counterfeit activity. For example, any tag history that does not begin with a commission event from an authorized source can indicate a fraudulent tag introduced into the supply chain. The following regular expression identifies a product path that does not include the appropriate commission tag.
→ ACommission → .*

The following regular expression detects a situation where a counterfeiter copies the tag of a product distributed in Western US and then introduces the product in another region.
.* → WesternRegionDistribution → .* → → WesternRegionDistribution Regular expressions may also be used for period based event detection. Consider the following transit times:
1:06:27 → 3:01:25 → 4:03:33

This information is difficult to match against a simple regular expression. The information can be recast in an approximated form by simply representing each day as say, D.
D → DDD → DDDD One could then look for any transit times that were suspiciously long:
.* → D{5,} → .*

The foregoing expression matches any transit time of 5 days or longer.

Those skilled in the art will appreciate that the paths formed in accordance with the invention may be analyzed using any number of techniques, including analysis of product transition events, testing of product sources, tracking of product locations, analysis of product history, and scrutiny of product statistics. Other product path events that may be analyzed include product transition boundary information, product absolute resident time information, and product transit information.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-readable medium storing instructions that, in response to execution, cause a system to perform operations, comprising:
identifying one or more transitions of a product between two different enterprise types based on an analysis of cross-enterprise radio frequency tag information;
defining generating product path information based on the one or more transitions; and
determining one or more trends in product flow and product consumption based on another analysis of the product path information.

2. The computer-readable medium of claim 1, wherein the generating the product path information comprises classifying the product path information into a group according to a common product transition characteristic.

3. The computer-readable medium of claim 1, wherein the generating the product path information comprises characterizing a state sequence of the product path information.

4. The computer-readable medium of claim 1, wherein the operations further comprise identifying a product flow exception based on a comparison between the product path information and one or more permissible trade path templates.

5. The computer-readable medium of claim 1, wherein the operations further comprise applying pattern matching between the product path information and a test template.

6. The computer-readable medium of claim 1, wherein the operations further comprise applying defined supply chain logic to the product path information.

7. The computer-readable medium of claim 1, wherein the operations further comprise applying defined replenishment process failure logic to the product path information.

8. The computer-readable medium of claim 1, wherein the operations further comprise applying defined trade promotion logic to the product path information.

9. The computer-readable medium of claim 1, wherein the logic includes operations further comprise applying defined taxation logic to the product path information.

10. The computer-readable medium of claim 1, wherein the operations further comprise applying defined regulatory compliance logic to the product path information.

11. The computer-readable medium of claim 1, wherein the operations further comprise applying defined recall logic to the product path information.

12. The computer-readable medium of claim 1, wherein the operations further comprise applying defined obsolescence logic to the product path information.

13. The computer-readable medium of claim 1, wherein the operations further comprise applying defined cross-contamination logic to the product path information.

14. The computer-readable medium of claim 1, wherein the operations further comprise applying defined unusual flow logic to the product path information.

15. The computer-readable medium of claim 1, wherein the operations further comprise applying defined inventory shrinkage logic to the product path information.

16. The computer-readable medium of claim 1, wherein the operations further comprise applying defined counterfeit identification logic to the product path information.

17. The computer-readable medium of claim 1, wherein the operations further comprise applying defined unauthorized importation logic to the product path information.

18. The computer-readable medium of claim 1, wherein the operations further comprise analyzing at least one of a product transition event, a product source, a product location, a product history, or a product statistic.

19. The computer-readable medium of claim 1, wherein the operations further comprise analyzing at least one of product transition boundary information, product absolute resident time information, or product transit information.

20. The computer-readable medium of claim 1, wherein the operations further comprise applying a regular expression to the product path information.

21. The computer-readable medium of claim 2, wherein the classifying further comprises classifying the product path information into the group based on a classification of at least one of the two enterprises as a manufacturer, a warehouse, a distributor, or a retailer.

22. The computer-readable medium of claim 1, wherein the operations further comprise filtering the product path information yielding filtered product path information that represents respective locations as one of a manufacturer, a warehouse, a distributer, or a retailer,
wherein the identifying the trend comprises identifying the trend based on analysis of the filtered product path information.

23. The computer-readable medium of claim 1, wherein the cross-enterprise radio frequency tag information respectively classifies the two enterprises as one of a manufacturer, a warehouse, a distributor, or a retailer.

24. The computer-readable medium of claim 1, wherein the generating the product path information comprises generating the product path information to characterize the cross enterprise radio frequency tag information in terms of the one or more transitions between the two different enterprise types.

25. A method, comprising:
determining, by a system comprising a processing device, product transitions between two different enterprise types comprising analyzing cross-enterprise radio frequency tag information;
generating product path information based on the product transitions; and
identifying at least a first trend in product flow and a second trend in product consumption comprising analyzing the product path information.

26. The method of claim 25, wherein the generating comprises generating the product path information to characterize the cross-enterprise radio frequency tag information in terms of the product transitions between the two enterprise types.

27. The method of claim 26, wherein the enterprise types comprise at least two from a group of enterprise types comprising manufacturer, warehouse, distributor, and retailer.

28. A system, comprising:
means for identifying one or more transitions of a product between two different enterprise types based on an analysis of cross-enterprise radio frequency tag information;
means for generating product path information based on the one or more transitions; and
means for identifying one or more trends in product flow and product consumption based on another analysis of the product path information.

29. The system of claim 28, wherein the means for generating comprises means for characterizing the cross-enterprise radio frequency tag information in terms of the one or more transitions between the two different enterprise types.

30. A system, comprising:
a processor, communicatively coupled to a memory, that executions or facilitates execution of computer-executable instructions stored by the memory to at least:
determine product transitions between two different enterprise types using an analysis of cross-enterprise radio frequency tag information;
generate product path information based on the product transitions; and
identify a trend in product flow and product consumption using another analysis of the product path information.

31. The system of claim 30, wherein the processor further executes or facilitates execution of the computer-executable instructions to generate the product path information to describe the cross-enterprise radio frequency tag information in terms of transitions between the two different enterprise types.

* * * * *